Oct. 24, 1933.   A. M. NIVEN   1,931,993
INTERNAL COMBUSTION ENGINE
Filed Nov. 7, 1929   2 Sheets-Sheet 2

INVENTOR.
ARCHIE M. NIVEN
BY W. W. Harris
ATTORNEY.

Patented Oct. 24, 1933

1,931,993

UNITED STATES PATENT OFFICE 1,931,993

INTERNAL-COMBUSTION ENGINE

Archie M. Niven, Detroit, Mich., assignor, by mesne assignments, to Continental Aircraft Engine Company, a corporation of Delaware Application November 7, 1929. Serial No. 405,477

12 Claims. (Cl. 123—195)

My invention relates to an internal combustion engine and more particularly to a radial engine adapted for use with aircraft, but I wish it understood that I do not limit my invention exclusively to use with aircraft engines as the principle of the invention may be embodied in engines other than aircraft engines, and in engines other than the radial type.

In the construction of aircraft engines, the manufacturers have been constantly striving to provide a more compact engine structure in order to minimize the size and weight of the engine, and to provide an efficient accessory drive mechanism assembly in which uneven driving torque is eliminated.

Another object of my invention is to obtain an improved engine performance in radial aircraft engines by mounting the various accessory driving mechanisms and so locating the same in a compact arrangement within the gear case that the same may be more efficiently connected in direct driving relation with respect to a common driving element carried by the crank shaft for eliminating uneven driving torque in the accessory drive mechanisms.

Another object of my invention is to facilitate the manufacture and operation of radial internal combustion engines by providing accessory driving mechanisms so arranged and constructed as to permit the use of straight or helical spur gears, that may be conveniently assembled and arranged to lie in substantially a common plane, and thereby be more readily and efficiently connected with a crank shaft of the engine.

A further object of my invention is to facilitate the manufacture and the maintenance of an internal combustion engine of the radial type by providing compactly arranged accessory driving mechanism, that may be readily assembled with the engine, and which are so arranged as to permit access to be readily had thereto to adjust the various mechanisms relative to each other and to the crank shaft, and which permits the ready replacement or repair of the various parts of the accessory drive mechanism when necessary.

A still further object of my invention is to provide an improved engine assembly by incorporating into the engine an improved accessory driving mechanism so arranged as to permit the mounting of the various accessories at the rear of the gear case, thereby eliminating objectionable obstructions about the periphery of the gear case which permits the ready assembly of the engine to the motor mounting frame of an airplane.

For a more detailed understanding of my invention, reference may be had to the accompanying drawings which illustrate one form which my invention may assume, and in which.

Figure 1:
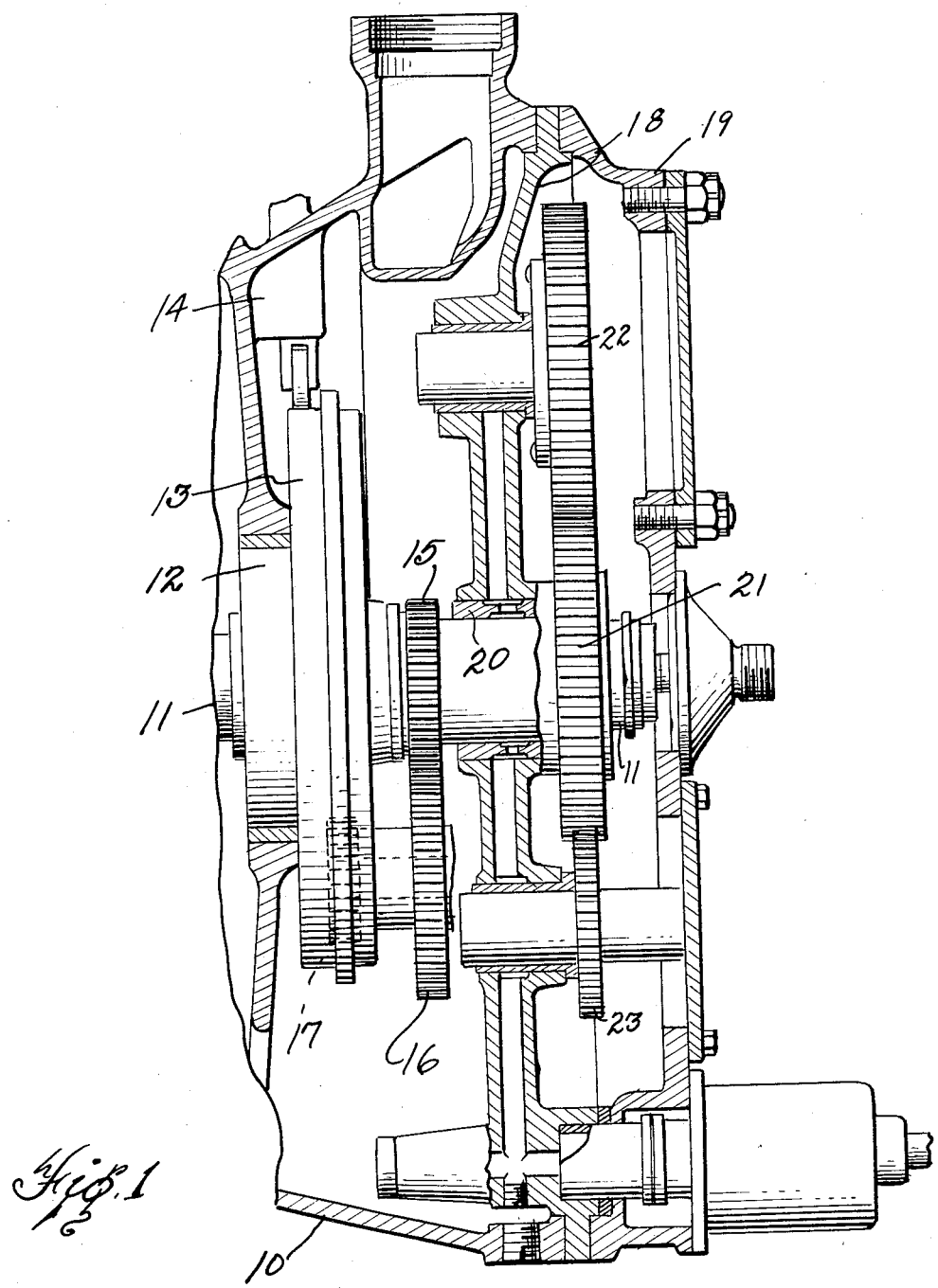
Figure 1 is a longitudinal sectional view through the rear portion of an internal combustion engine constructed in accordance with my invention and showing my improved arrangement for assemblying the accessory gear drives within the gear case of the engine.

My improved accessory gear drive assembly is adapted to be incorporated with radial internal combustion engines, especially adapted for aircraft use, and includes the usual type of crank case 10, that supports a crank shaft 11 in suitable bearings 12. The crank shaft is provided with the usual type of valve cam 13 for operating the valve actuating mechanism 14, and this valve cam is driven from the crank shaft in the usual manner by an intermediate driving mechanism, which includes the gear 15 operatively connected with the crank shaft and which meshes with a gear 16 that is connected with the gear 17, which meshes with an internal ring gear carried by the valve cam.

Figure 2:
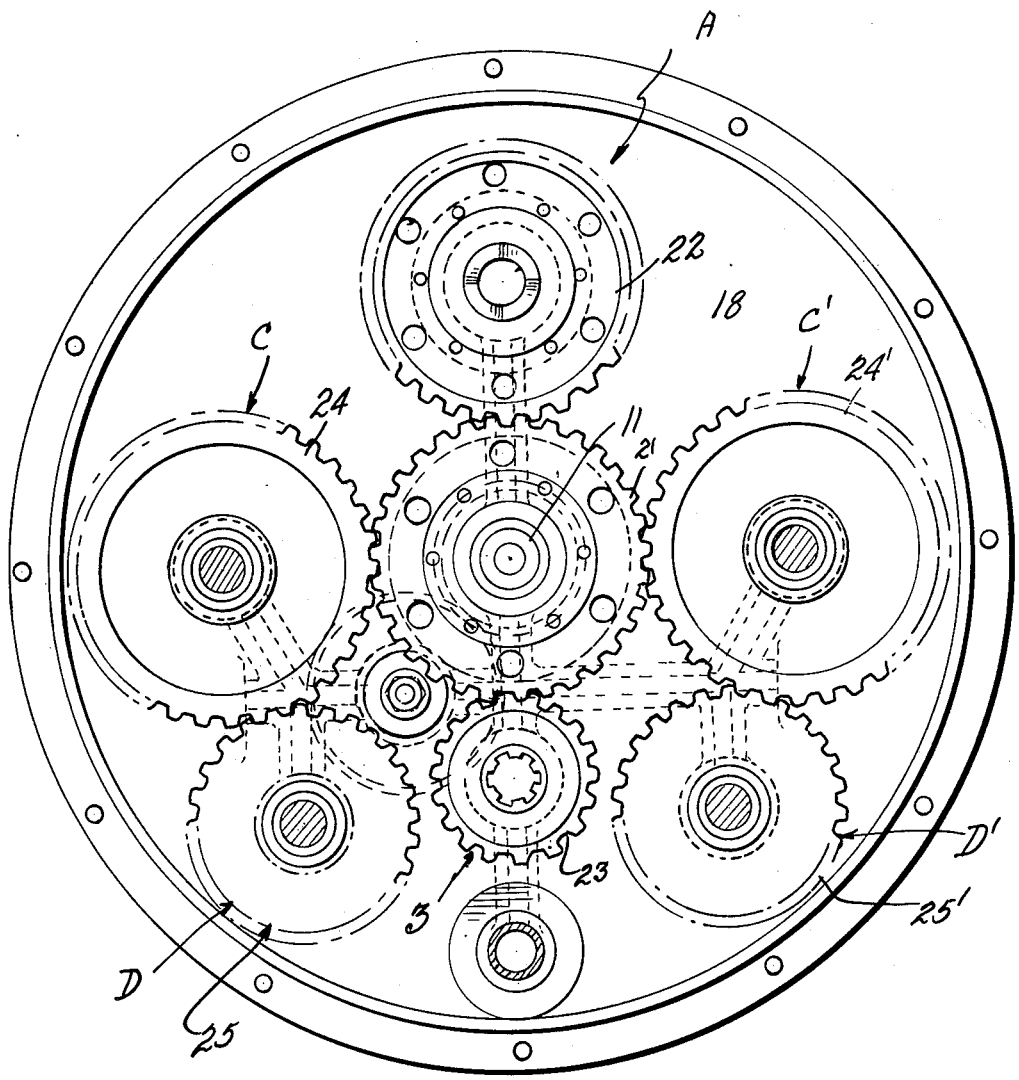
Figure 2 is a rear elevation of the engine with the gear case cover removed and showing the accessory gear drives.

A gear case for housing the accessory drive mechanism is located to the rear of the crank case and includes a wall structure 18 that is extended transversely of the longitudinal axis of the crank shaft, and secured to the crank case by any suitable fastening means. This wall defines the inner wall of the gear case. The cover 19 is secured to said crank case and defines the outer wall of the gear case. The wall 18 is provided with a bearing 20 for supporting the outer end of the crank shaft, said crank shaft extending through said wall and having keyed or otherwise secured thereto, a crank shaft starter gear 21, which, as shown in the drawings, is located adjacent to and to the rear of said wall 18. The wall 18 is provided with a plurality of bearings which support the various accessory drive mechanisms that are housed within the gear case. In the drawings, I have illustrated these various accessory drive mechanisms and they may be enumerated as follows: a starter drive mechanism A; a generator drive mechanism B; a pair of magneto drive mechanisms C and C'; and a pair of pump drive mechanisms D and D' (see Figure 2). Any suitable bearing device may be utilized for supporting these various accessory drive mechanisms. The starter drive mechanism A includes a starter gear 22 and the generator drive mechanism includes a generator gear 23, the magneto drive mechanism C and C' include respectively the gears 24 and 24', and the pump drive mechanisms D and D' respectively include the gears 25 and 25'. These various gears above enumerated are so constructed and supported by the wall 18 as to be positioned in substantially a common plane, that is parallel to the plane of the wall 18, and perpendicular to the longitudinal axis of the crank shaft. Furthermore, these gears are positioned in substantially the same plane as the crank shaft gear 21, the starter and generator gears 22 and 23 and the magneto gears 24 and 24' being directly connected to the crank shaft starter gear 21 as shown in Figure 2. The pump gears 25 and 25' are preferably directly connected with the magneto gears 24 and 24' respectively, but it is obvious that these pump gears may be connected with gears, other than the magneto gears, if found desirable.

It will be noted that this gear assembly is compactly arranged and the various gears are so symmetrically located with respect to the crank shaft that the driving torque is evenly distributed and equalized. By locating these various gears of the accessory drive mechanism to the rear of the wall 18, it is possible to so mount the gears in a common plane without interfering with the intake manifold carried by the crank case which is located immediately ahead of the wall 18, this intake manifold being annular and preferably extending about the periphery of the crank case and projected inwardly thereof. My arrangement provides for a dividing wall, which is located closely adjacent to the intake manifold in order to shorten the overall length of the engine and is permitted to be so located because of the fact that I have provided an improved arrangement of accessory drive gears, that may be located in substantially the same plane and to the rear of said wall.

My construction permits the ready assembly of the various gears of the accessory drive mechanism with the engine and access may be readily had to these gears for any purpose, by removing the gear case cover 19, which is secured solely to the crank case and does not carry any parts of the accessory drive mechanisms.

It will thus be seen that replacement of these gears is a simple operation, thereby materially decreasing the maintenance costs for internal combustion engines of this character.

Furthermore the arrangement of the driving gears of the accessory driving mechanisms is such that the same are readily visible and the said mechanisms can be readily timed when so desired.

Although I have illustrated but one form of my invention and have described in detail but a single application thereof, it will be apparent to those skilled in the art, to which my invention pertains, that various modifications and changes may be made therein without departing from the spirit of my invention or from the scope of the appended claims.

What I claim as my invention is:

1. In an internal combustion engine of the radial type, the combination of a crankcase, a crank shaft, a crank shaft starter gear associated with said crank shaft and operatively connected therewith, and a plurality of accessory driving mechanisms including a starter gear, a generator gear, and a magneto driving gear, each of said gears being directly connected with said crank shaft starter gear and substantially uniformly angularly spaced about said shaft to equalize the driving torque.

2. In an internal combustion engine of the radial type, the combination of a crankcase, a wall adjacent the rear of said crankcase, a crank shaft supported in part by said crankcase and extending through said wall, valving mechanism operatively connected with said crankshaft and located forwardly of said wall, a crank shaft starter gear to the rear of said wall and operatively connected with said crank shaft, and a plurality of accessory driving mechanisms including a starter gear element, a generator gear element and a magneto driving gear element, each of said elements supported by said wall and to the rear thereof and directly connected with said starter gear, said elements mounted for rotation about parallel axes.

3. In an internal combustion engine of the radial type, the combination of a crankcase, a gear structure secured to said crankcase and including a wall adjacent the rear of the crankcase, a crank shaft supported in part by said crankcase and extending rearwardly through said wall into said gear case, a crank shaft starter gear operatively connected with said crank shaft and positioned to the rear of said wall, valving mechanism located forwardly of said wall and including gearing, and a plurality of accessory drive gears directly connected with and lying in substantially the same plane as said crank shaft starter gear.

4. In an internal combustion engine of the radial type, the combination of a crankcase, a gear structure secured to said crankcase and including a wall adjacent the rear of the crankcase, a crank shaft supported in part by said crankcase and extending rearwardly through said wall into said gear case, a crank shaft starter gear operatively connected with said crank shaft and positioned to the rear of said wall, valving mechanism forwardly of said wall, a starter gear supported by and to the rear of said wall, said starter gear directly connected with and lying in substantially the same plane as said crank shaft starter gear, and a valve mechanism driving gear secured to said crankshaft forwardly of said wall.

5. In an internal combustion engine of the radial type, the combination of a crankcase, a crank shaft, a crank shaft starter gear operatively connected with said crank shaft, one or more magneto driving gears directly connected with and lying in substantially the same plane as said crank shaft starter gear, and a pump drive gear directly connected with and lying in substantially the same plane as said magneto driving gear associated therewith, said pump drive gear and magneto driving gear mounted for rotation about substantially parallel axes.

6. In an internal combustion engine of the radial type, the combination of a crankcase, a crank shaft, a crank shaft starter gear operatively connected with said crank shaft, one or more accessory drive gears each directly connected with and lying in substantially the same plane as said crank shaft starter gear, and a pump drive gear directly connected with one of said accessory drive gears and lying in substantially the same plane as said crank shaft starter gear and associated accessory drive gear, said gears mounted for rotation about parallel axes.

7. In an internal combustion engine of the radial type, the combination of a crankcase, a wall adjacent the rear of said crankcase, a crank shaft supported in part by said crankcase and extending through said wall, valving mechanism forward of said wall and operatively connected with the crankshaft, a crank shaft starter gear located to the rear of said wall and operatively connected with said crank shaft, one or more accessory drive gears each directly connected with and lying to the rear of the wall in substantially the same plane as said crank shaft starter gear, and a pump gear supported by and to the rear of said wall, said pump drive gear directly connected with one of said accessory drive gears and located in substantially the same plane as said crank shaft starter gear and associated accessory drive gear, said gears mounted for rotation about parallel axes.

8. In an internal combustion engine of the radial type, the combination of a crankcase, a gear case structure secured to said crankcase and including a wall adjacent the rear of said crankcase, a crank shaft projected beyond the rear face of said wall, valving mechanism forward of said wall and operatively connected with the crank shaft, a plurality of accessory driving mechanisms located to the rear of said wall and including drive shafts, bearings for supporting said accessory drive shafts for operation about parallel axes and projected forwardly of said wall, and means for operatively connecting said accessory driving mechanisms with said crankshaft.

9. In an internal combustion engine of the radial type, the combination of a crankcase, a gear case structure secured to said crankcase, and including a wall adjacent the rear of said crankcase, a crank shaft projected beyond the rear face of said wall, valving mechanism forward of said wall and operatively connected with the crankshaft, a plurality of spaced accessory driving mechanisms operatively connected with said crankshaft and including driving shafts supported by said wall and interengaging spur gears carried by said shafts and positioned in a common plane to the rear of and parallel to the plane of said wall and mounted for rotation about parallel axes.

10. In an internal combustion engine of the radial type, the combination of a crankcase, a wall adjacent the rear of said crankcase, a crank shaft projected beyond the rear face of said wall, valving mechanism forward of said wall and operatively connected with the crank shaft, a plurality of unconnected accessory driving mechanisms operatively connected with said crank shaft and including a pump driving mechanism directly connected with one of said accessory driving mechanisms, said mehanisms including driving shafts supported by said wall and interegaging spur gears carried by said shafts and positioned in a common plane to the rear of and substantially parallel to the plane of said wall, said gears mounted for rotation about substantially parallel axes extending substantially parallel to the crank shaft axis.

11. In an internal combustion engine of the radial cylinder type, the combination of a crankcase, a wall structure adjacent the rear of the crankcase and extending substantially parallel to an engine plane containing the cylinder axes, a crankshaft supported by said wall, a crankshaft starter gear driven by said crankshaft and a plurality of accessory driving gears including a starter gear, magneto and pump driving gears operatively connected with the crankshaft starter gear and positioned symmetrically in nested arrangement about said crankshaft starter gear with respect to an engine plane containing the crankshaft and starter gear axes, said accessory driving gears lying in substantially the same plane as the crankshaft starter gear and supported by said wall for rotation about axes substantially parallel with the crankshaft axis.

12. In an internal combustion engine of the radial cylinder type, the combination of a crankcase, a wall structure adjacent the rear of the crankcase and extending substantially parallel to an engine plane containing the cylinder axes, a crankshaft supported by said wall, a crankshaft starter gear driven by said crankshaft and a plurality of accessory driving gears including magneto and pump driving gears operatively connected with the crankshaft starter gear, said accessory driving gears lying in substantially the same plane as the crankshaft starter gear and supported by said wall for rotation about axes substantially parallel with the crankshaft axis.

ARCHIE M. NIVEN.